June 23, 1942.   H. W. SHONNARD   2,287,068
APPARATUS FOR TRANSPORTING FREIGHT
Filed Dec. 17, 1938   6 Sheets-Sheet 1

INVENTOR
Harold W. Shonnard
BY
Marshall & Hawley
ATTORNEYS

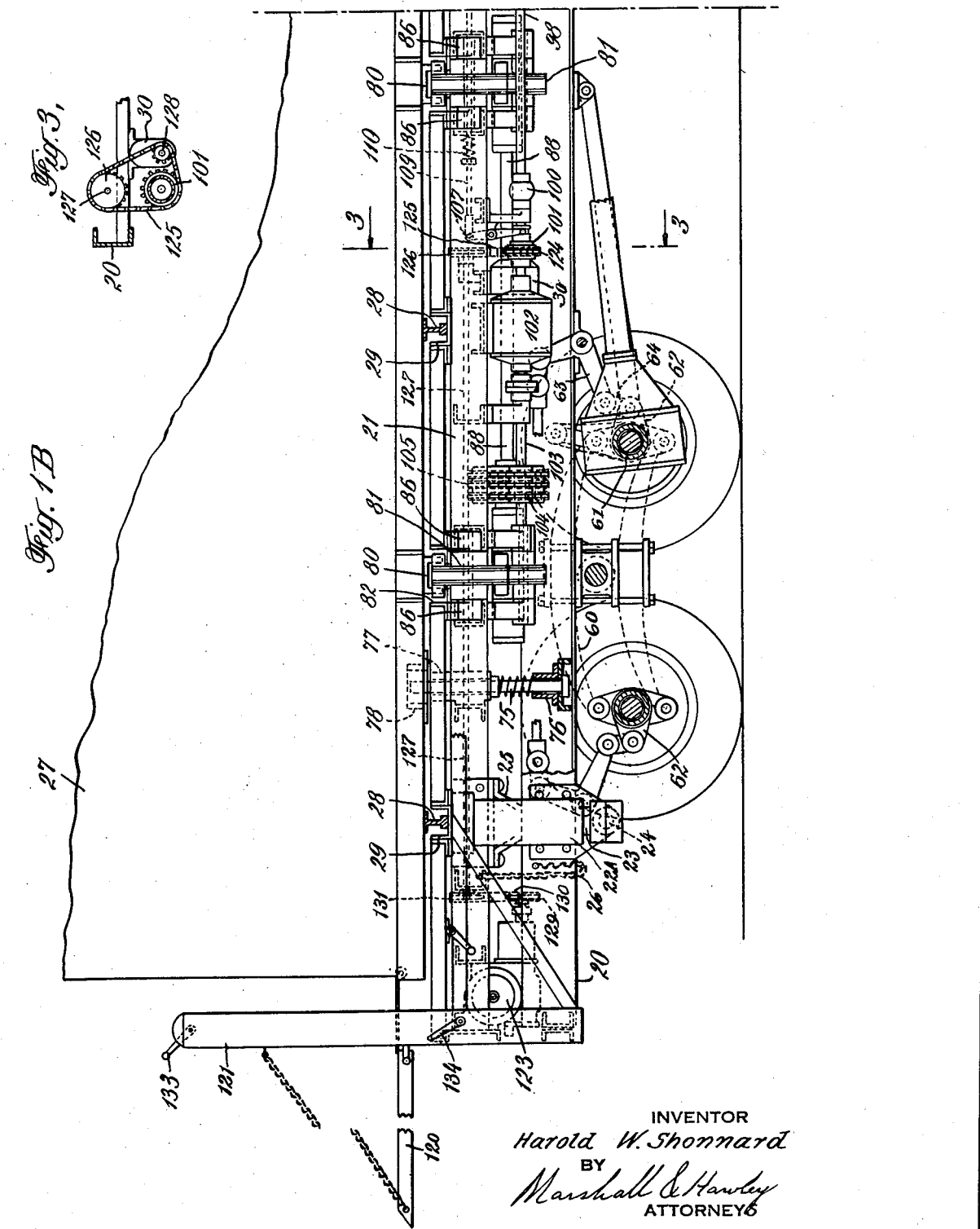

June 23, 1942.  H. W. SHONNARD  2,287,068
APPARATUS FOR TRANSPORTING FREIGHT
Filed Dec. 17, 1938  6 Sheets-Sheet 3
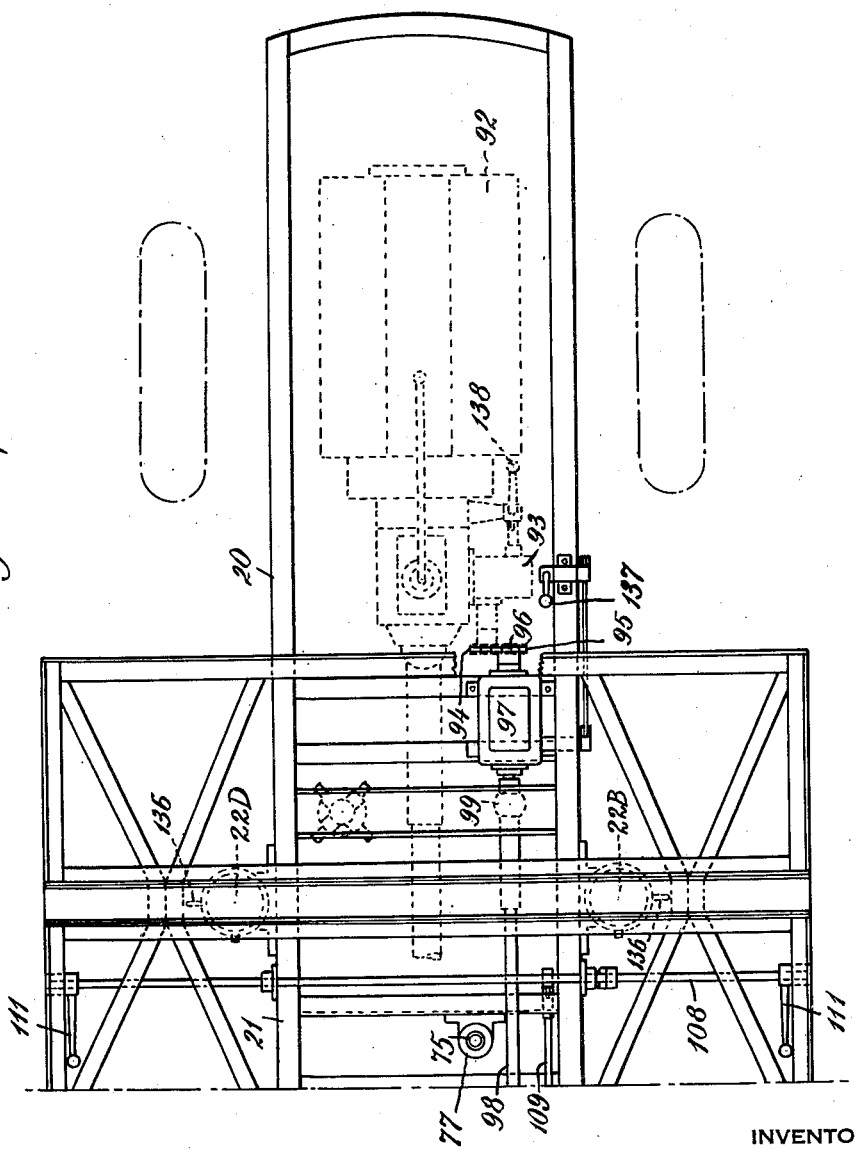
INVENTOR
Harold W. Shonnard
BY
Marshall & Hawley
ATTORNEYS

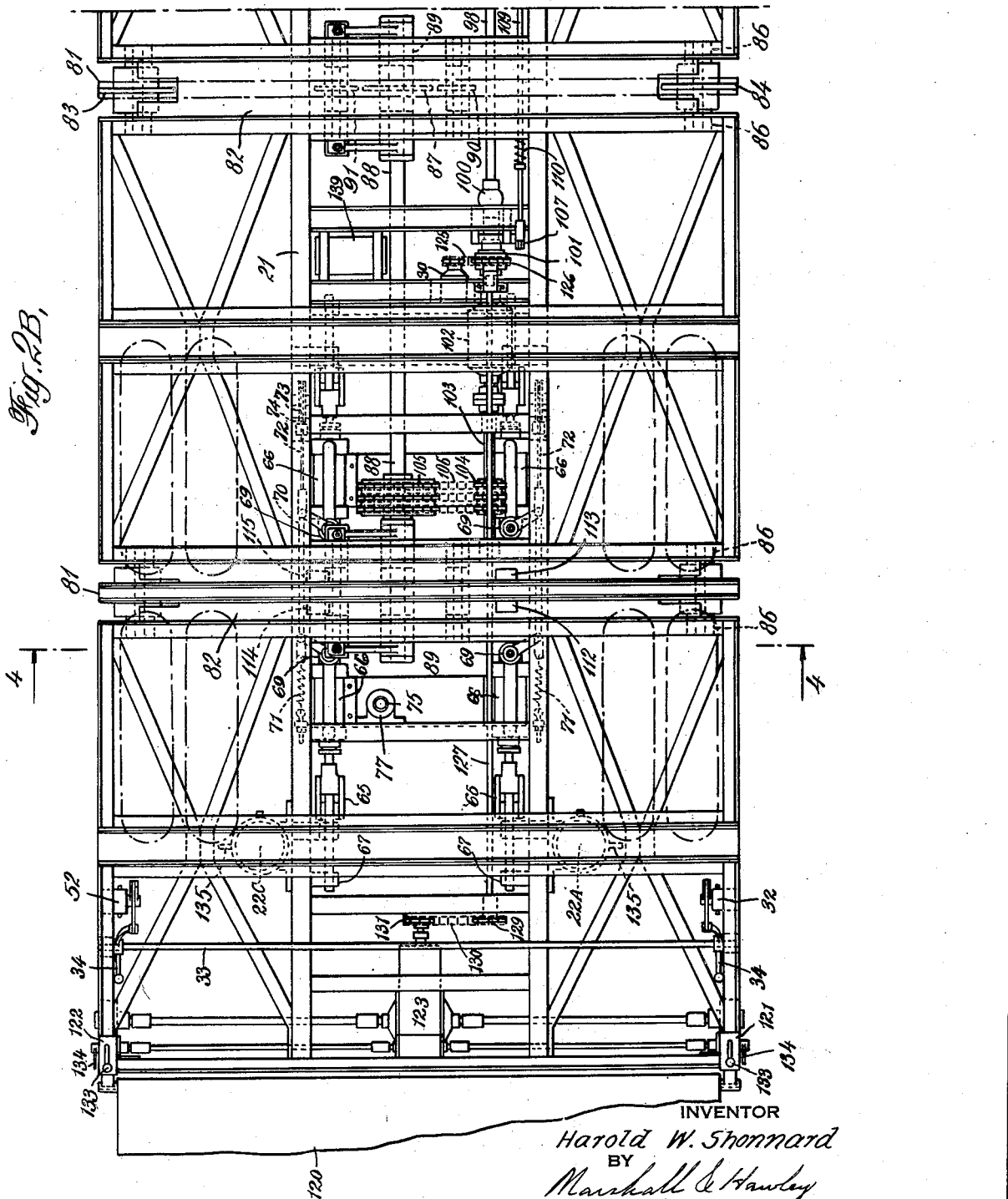

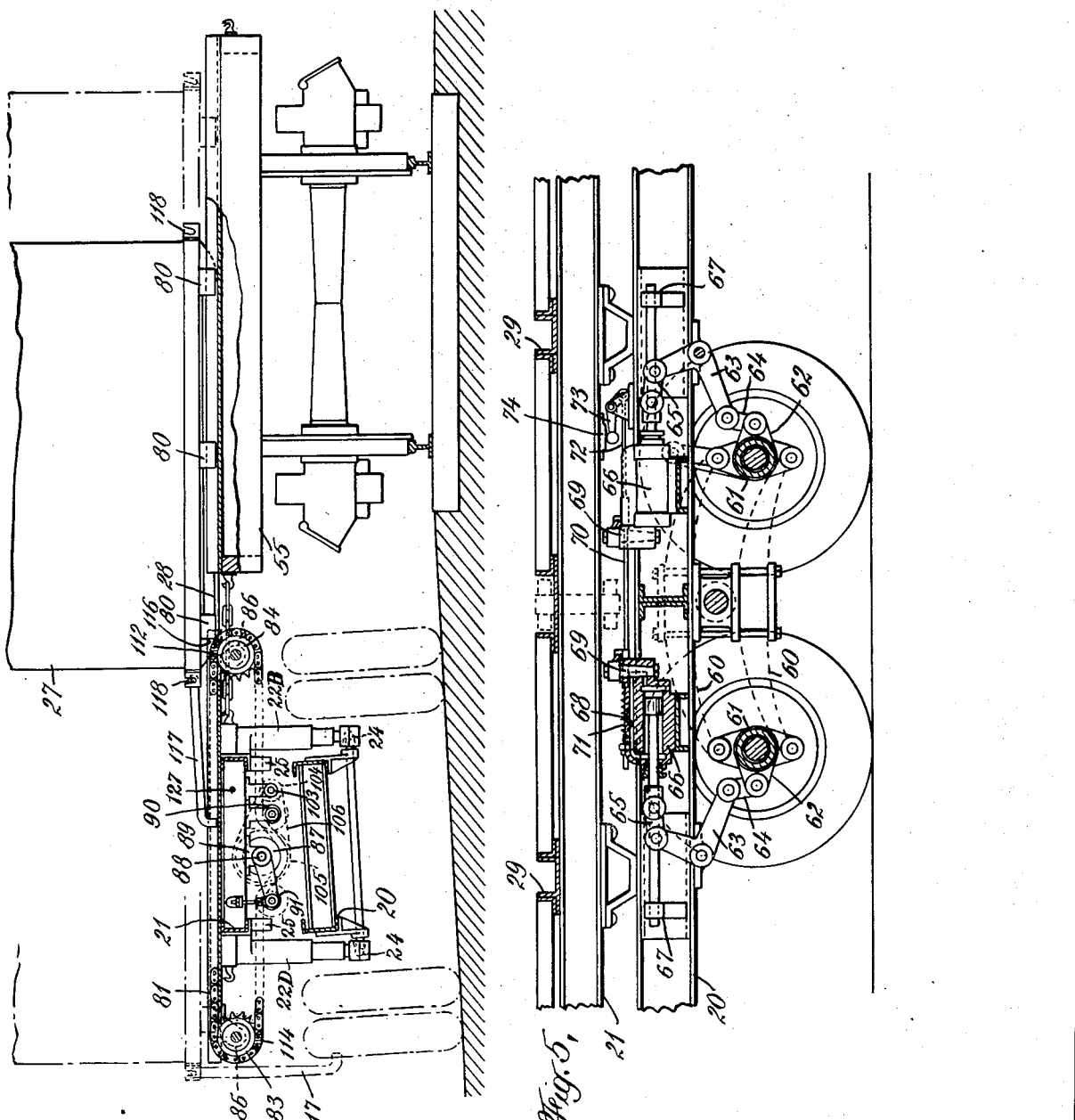

June 23, 1942. H. W. SHONNARD 2,287,068
APPARATUS FOR TRANSPORTING FREIGHT
Filed Dec. 17, 1938 6 Sheets-Sheet 6
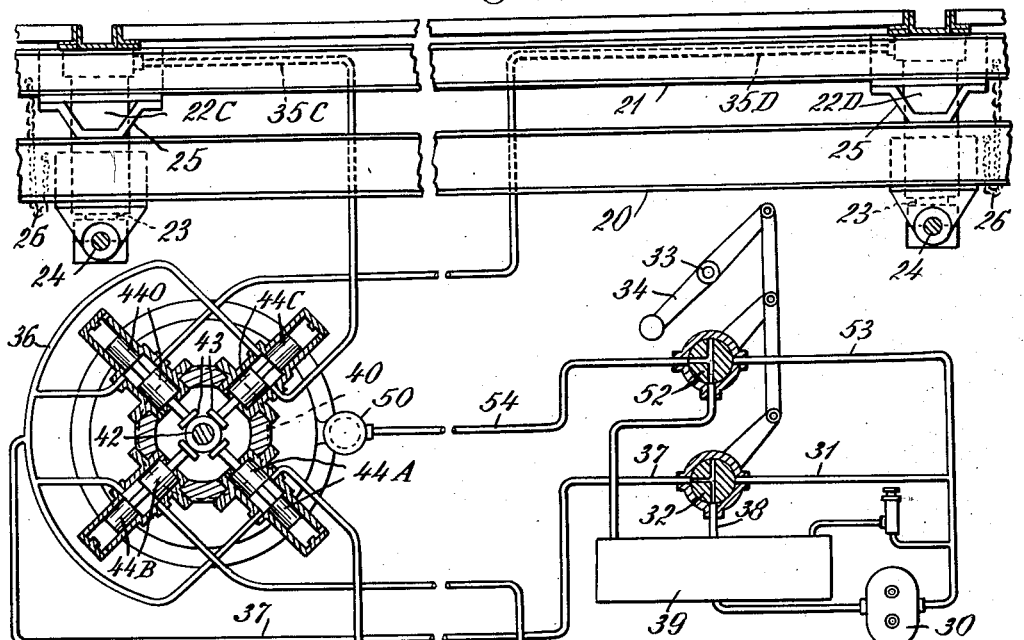
Fig. 7.
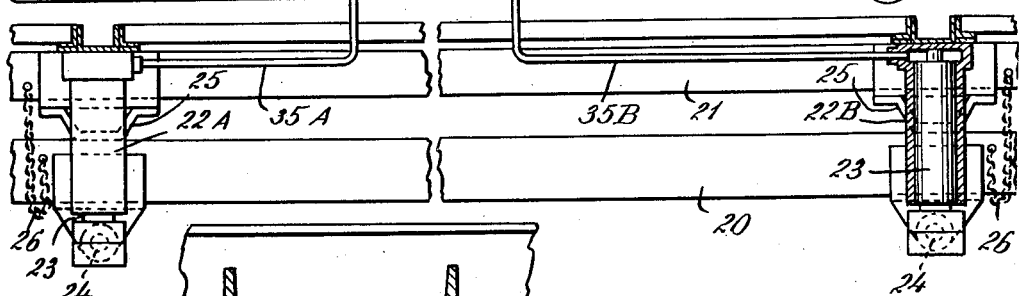
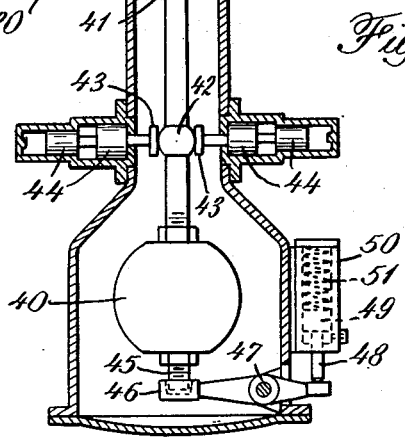
Fig. 6.
INVENTOR
Harold W. Shonnard
BY
Marshall & Hawley
ATTORNEYS Patented June 23, 1942

2,287,068

UNITED STATES PATENT OFFICE 2,287,068

APPARATUS FOR TRANSPORTING FREIGHT

Harold W. Shonnard, Montclair, N. J.

Application December 17, 1938, Serial No. 246,318

25 Claims. (Cl. 214—38)

This invention relates to apparatus for transporting freight.

Its object is to increase the efficiency in the transportation of freight from its point of origin to its ultimate destination, by consolidating less than carload lots into substantially carload containers for transportation by railway, transferring such carload shipments at railway terminals or at rail sidings to highway vehicles arranged to make sidewalk delivery of heavy divisions of the freight contents of such containers.

A part of such apparatus pertains to means for moving transferrable bodies or freight containers horizontally from one to another substantially parallel vehicles spaced apart from each other, one of which vehicles may be a motor truck or a tractor-trailer type of vehicle, herein designated as a transfer vehicle, on which means is provided for moving the transferrable body transversely to the right or left of the transfer vehicle a distance exceeding the width of the transfer vehicle to transport position on an adjacent vehicle, or from an adjacent vehicle, or to or from a platform.

Another object is to provide for moving transferrable bodies or containers transversely to or from the transfer vehicle by power means permanently confined within the transverse width of the transfer vehicle.

Another object is to provide means for raising or lowering such a container on a vehicle to the height of the floor of an adjacent vehicle or platform and to provide means for automatically maintaining such a container in a substantially horizontal position regardless of the grade of the road beneath the vehicle.

Further objects are to provide means for preventing vertical movement of the vehicle springs while taking on or discharging a container, to provide means for automatically locking the container in position on the vehicle and to provide power operating means for raising and lowering freight to and from a removable container on the vehicle.

These and other objects of the invention will appear in the following specification in which I will describe the invention, the novel features of which will be pointed out in appended claims.

Records show that the extensive use of motor vehicles for the transportation of L-C-L (less than carload lots) shipment of freight over the highways is largely responsible for the decline in railway freight revenues. In 1935, under the direction of the Federal Coordinator of Transportation, an exhaustive study of the subject was made and published under date of June 15, 1936. From data published in that report it is apparent that neither present railway L-C-L freight handling methods, nor their facilities, are adapted to compete with highway transportation.

It has been demonstrated that it is entirely practical to collect and consolidate L-C-L shipments into large containers and to transfer such containers from highway vehicles to railway cars through the use of gantries or jib-cranes and that experience has shown that such cranes are not sufficiently flexible and are very costly, and therefore, having in mind that the railway tariff on container (substantially carload shipments) is very much lower than for shipments of unconsolidated freight, it is apparent that highway operators using equipment of the type herein described can avail themselves of carload rail rates for long haul shipments accepted by them at L-C-L rates.

It is one of the objects of this invention to provide for the packing of containers in the order of consignee distribution, in order that delivery of the contents of shipped containers may be made directly to respective consignees; the cycle of delivery being that the containers are transferred at the rail terminal to local delivery vehicles which discharge the contents of the containers on their routes, according to the sequence of distribution pre-arranged in the packing of the containers.

The mechanism herein described includes an elevator at the rear end of the vehicle to facilitate the handling of heavy packages.

Closed containers of any of the well known constructions having access doors at one or both ends, meet the requirements of the proposed service, so that the type of container used forms no part of this invention. For the shipment of lumber, pipe or similar material, flat platforms with or without stakes at the sides may be used.

It is realized that the use of containers has limitations and that for some types of freight they are not practical, but having the means to transfer them from a highway vehicle to rail cars safely and quickly, the described method of shipping less than carload lots of freight is of great economic value to both the railways and to highway operators, and at the same time extends the possibility of lower overall rates to shippers and consignees.

Excepting the hoisting element, the container manipulating mechanism herein described for transferring containers may also be installed on self-propelled rail cars to transfer containers laterally from trains wherever situated at their terminals, to highway vehicles of the ordinary flat platform type.

Referring to the drawings,

Figs. 1A and 1B illustrate in one form, power operated vehicles which embody this invention;

Figs. 2A and 2B show in plan the parts illustrated in Figs. 1A and 1B;

Fig. 3 is a sectional end elevation of some of the parts shown in Fig. 1B, the section being taken on the line 3—3 of the latter figure;

Fig. 4 is a transverse sectional elevation on line 4—4 of Fig. 2B, showing the highway type of vehicle resting on a transversely sloping roadway, alongside a railway car and with a container shown in several of the positions it takes when being transferred from the highway vehicle to the car;

Fig. 5 is a side elevation in section of an arrangement for automatically limiting the depression and reaction of the vehicle during a container transferring operation;

Fig. 6 is a vertical cross section of a gravity actuated control valve unit for the leveling device;

Figure 1A:
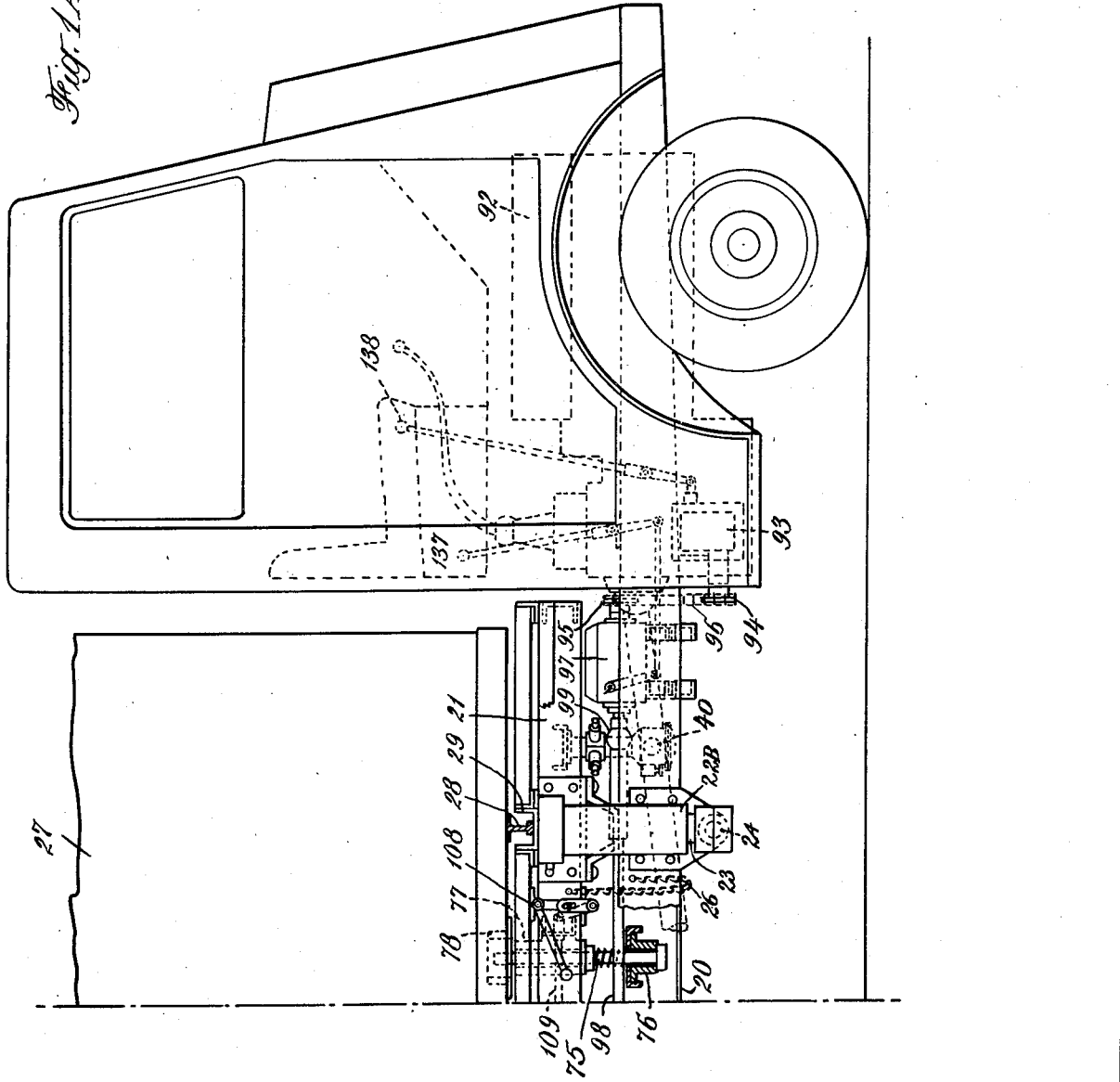

Fig. 7 is a composite drawing of the automatic platform leveling arrangement, showing the gravity actuated control valve unit in horizontal section and the lifting jacks in elevation, (one of them being shown in section). This figure also shows in horizontal section a twin valve which serves to reverse the flow of fluid through the gravity actuated control valve for a purpose which will be pointed out later, a valve for starting and stopping ascent and descent of the vehicle platform, said valve being shown in vertical section, and shows diagrammatically a pressure pump and reservoir and the pipe lines interconnecting the various parts.

In the drawings, 20 designates the chassis of a highway vehicle. In order to safely and expeditiously effect a lateral transfer of loaded containers, ten to twenty feet or more in length and weighing sometimes over twenty tons, from transport position on such a vehicle to transport position on a railway car it is necessary that the support on the vehicle for the container be brought to and maintained during the transfer at the height of the car platform, and that it be level regardless of the level of the surface under the vehicle. To this end, a container supporting frame 21 is mounted on the chassis by mechanisms which provide for it to be raised and lowered by a manually controlled device and leveled automatically. 28 designates skids on the bottom of a container 27 which rest in transverse channels 29 on the frame.

The instrumentalities for accomplishing these results comprise four inverted cylinders 22A, 22B, 22C and 22D which are affixed to spaced parts of the frame 21. In these cylinders are oil tight pistons 23, each of which is pivotally connected to the chassis, as at 24. These are fluid pressure jacks which are actuated by oil pressure from a pump 30, the discharge pipe 31 of which is connected to a manually controlled valve 32 which is moved by connection with a control shaft 33 extending across the frame 21 and having levers 34 near its ends.

Fig. 7 shows pipes 35A, 35B, 35C, 35D leading from the cylinders through an automatic gravity actuated leveling device which will be described later, to a manifold 36 and from the manifold through pipe 37 to valve 32. Through ports in the valve, when the latter is in the position shown in Fig. 7, oil from the cylinder can flow through a pipe 38 into a reservoir 39. This will allow the frame 21 to descend until stops 25 on it contact with the chassis 20.

When it is desired to raise the frame, levers 34 are raised 90° to bring the ports in valve 32 into position to connect pipes 31 and 37, so that oil under pressure is led to the four cylinders. This will cause the frame 21 to rise. Its movement can be arrested at any time by moving levers 34 to a horizontal position, thus closing valve 32. The oil in the cylinders cannot then flow out and will maintain the frame in its raised position. The upward movement of the frame is limited by stop chains 26.

It is important that the frame 21 be level at the time the container is transferred and to attain this result an automatic gravity actuated leveling device is used. This is shown in Fig. 6 and in sectional plan view as a part of Fig. 7. It comprises a pendulum 40 which is universally pivoted at 41. Intermediate its length is a spherical enlargement 42, against which abut the ends 43 of four differential pistons 44A, 44B, 44C and 44D. The oil from the manifold 36 is led into spaces between the differential pistons. The inner parts of the differential pistons are somewhat larger than their outer parts so that the pressure in the space between these parts tends to move them inwardly into contact with the spherical enlargement 42.

The pipes 35A, 35B, 35C, 35D connect with the spaces between the differential pistons. When the parts are in the positions shown in Fig. 7 the oil will flow from the manifold 36 through these spaces and through the pipes 35A, 35B, 35C, 35D to the cylinders at a uniform rate. If the right hand end of the chassis 20 is lower than the left hand end, the pendulum 40 will swing to the right causing the differential pistons 44A and 44C to be moved outwardly. The larger parts of these pistons will close or throttle the ports to which the pipes 35A and 35C are connected, so that the flow of oil to cylinders 22A and 22C will be stopped or retarded. The result is that the right hand end of the frame will be raised while the left hand end will remain at rest or move upwardly at a slower rate.

Similarly, the pipe connections to the cylinders 22A and 22B may be shut off or throttled while those at the other side of the chassis, that is cylinders 22C and 22D, will be fully effective if the side of the chassis which is represented at the upper part of Fig. 7 is lower than the other side. This will cause the frame to reach a horizontal position and if it does before the frame has reached the desired height, the frame will continue to move upwardly in a horizontal position.

It is desirable to lock the pendulum when not in use, against swinging out of its vertical position. To accomplish this the lower end 45 of the pendulum extends downwardly into the cup-shaped end 46 of a locking device which is pivoted at 47 and connected at the side of its pivot away from its cup-shaped end with a rod 48 extending downwardly from a piston 49 in a cylinder 50. Above this piston is a spring 51 which presses against the piston and raises the cup-shaped end of the locking device to engage the extension 45 of the pendulum.

It will be noted that this locking effect can be obtained only when the pendulum is in its vertical position. In order to unlock it a valve 52 is provided. This is mechanically connected to move in unison with the valve 32. 53 is a pressure pipe leading to valve 52 and 54 is a pipe interconnecting valve 52 and cylinder 50. When the control levers 34 are moved to connect the pressure pipe 31 with the manifold pipe 36 and the cylinders, valve 52 will be positioned to connect pipes 53 and 54 and the pressure then introduced under piston 49 will move the locking device away from the extension 45 of the pendulum.

When the valve 32 is moved to permit the frame to descend, the oil which flows to valve 32 through pipe 37 will be under a considerable pressure due to the weight of the frame and any load which may be upon it. Furthermore, it is desirable to permit the operator to manipulate valve 32 to control the rate at which the oil may flow through it and thus control the rate of the descent of the frame. As it is desirable to lock the pendulum before the descent of the frame is started, the valve 52 is provided so that oil from cylinder 50 can flow freely into reservoir 39 without being effected by the pressure in pipe 37. As the discharge effect of valve 52 should not be affected by a throttling manipulation of valve 32, the ports in valve 52 may be larger than those in valve 32.

When a transfer of a container is made to or from a truck, the action of its springs would have a tendency to disturb the level of the chassis 20 and thus the level of frame 21 in relation to that of the car platform. To prevent this, the arrangement shown in Fig. 5 is provided.

The intermediate part of springs 60 is attached to the chassis 20 and their ends attached to axle housings 61. Shackles 62 are rigidly attached to these housings. The shackles are connected by angle levers 63, pivoted to the chassis, and links 64 and 65 to piston rods which project from cylinders 66 and are guided in bearings 67. The cylinders are filled with oil which can circulate from one end of each cylinder to the other through ports 68 and valves 69 when the valves are open.

Interconnecting adjacent valves 69 is a link 70. A spring 71 (Fig. 2b) exerts a pull on link 70 to the left. The other end of each link 70 is connected by a flexible member 72 to one arm of an angle lever 73 pivotally mounted on the chassis, with its other end in the path of movement of a contact plate 74 on the frame. These parts are so arranged that when the frame stops 25 rest upon the chassis, the link 70 will be pulled to the right to keep valves 69 open to unlock the vehicle springs 60 when the frame 21 is at rest on the chassis 20. When the frame 21 is raised from the chassis, the spring 71 will pull link 70 to the left to close valves 69. This will prevent circulation of oil from one end of cylinders 66 to the other and prevent any substantial movement of the shackles 62 and lock the chassis and chassis springs against vertical movement when the pressure on the vehicle springs 60 changes.

Spring pressed plungers 75 extend upwardly from housings 76 on the chassis 20, through guides 77 on the frame 21 and above the upper surface of the frame when the latter is in its lowermost position. The upper ends of these plungers extend into flanged receptacles 78 on the containers. These prevent lateral displacement of the container on the frame of the vehicle.

When frame 21 is elevated, the receptacles 78 are raised above the plungers so that the receptacles can be moved laterally. When a container has been transferred to a vehicle frame and the frame is lowered, the receptacles 78 will engage the plungers and be held by them. If the receptacles do not at first register with the plungers, the latter will be depressed until the container is positioned properly in alignment with the plungers 75.

For transferring a container from one to another vehicle, there is secured to the underside of each container one or more series of lugs 80, Figs. 1B and 4. These lugs are slightly less in height than the height of the skids 28, as shown in Fig. 4, in order to protect them from injury by contacting with the surface on which the container supporting skids 28 rest, or during the transfer of a container from or to a vehicle or platform.

To apply power for transferring a container, there is provided one or more sprocket driven chains 81 arranged transversely of the vehicle, as shown in Figs. 1B, 2B and 4. Supported by and secured to longitudinal members of the vertically movable frame 21 are one or more troughs 82 which support the chains, near the ends of which are sprocket wheels 83, 84, Fig. 4, supported on shafts in bearings 86 attached to the underside of the troughs 82. Between the sprocket wheels 83, 84 is another sprocket wheel 87 supported on a shaft 88 in bearings 89, also attached to the frame 21. In alinement with the sprocket wheel 87 are sprocket wheels 90 and 91 also mounted on the frame. The latter are pivotally and adjustably mounted on the bearings 89 for adjusting the tension on the chain 81.

Transmission of power to the sprocket chain system above described is accomplished as shown in Figs. 1A, 1B, 2A and 2B, wherein an engine 92 mounted upon the chassis 20 of the vehicle is arranged for transmitting reversible motion to the container transfer chains 81. 93 designates a power take-off unit of well known construction connected to the engine 92. Power from this unit is transmitted by sprocket wheels 94 and 95 and the chain 96 to a power reversing unit 97, also of well known construction, mounted on the chassis 20. This is connected by a deflectable shaft 98 and the universal couplings 99 and 100 to a slidable member of a normally open friction clutch 101, the opposite member of which is mounted upon the input shaft of a speed reducing unit 102. This speed reducing unit, secured to and suspended from the underside of the vertically movable frame 21 has its output shaft 103 connected with the shaft 88 by means of the sprockets 104 and 105 and the sprocket chain 106, whereby the sprocket wheels 83, 84 are driven to operate the container transferring chains 81.

A clutch shifting lever 107, for opening and closing the clutch 101, is pivotally attached between its upper and lower ends to the underside of the frame 21. At its upper end it is pivotally connected to a manual control shaft 108 by a link 109. Attached to the link 109 is a spring 110 to maintain the clutch 101 normally open. At each end of the control shaft 108 is an operating lever 111 for manually imparting partial rotation thereto for closing the clutch 101 from either side of the vehicle.

To each side of each of the container transfer chains 81, at equal distances apart, are affixed lugs 112, 113 and 114, 115, shown in Fig. 2B.

When transferring a container from a vehicle equipped in the preferred form above described, one of the pairs of lugs on the chain 81 will engage one of the center lugs 80 attached to the underside of the container (Fig. 4). This will move the container according to the direction of motion of the chains 81, to the right or left on the discharging vehicle until the lugs on the chain 81 which are engaged with the center lug 80 pass around the sprocket 83 or 84, as at 116, Fig. 4, and thus are disengaged from the center lug, whereupon movement of the container discontinues until the next pair of approaching chain lugs contact one of the outermost lugs 80 on the container to move the container an additional distance until the second pair of lugs on the chain are disengaged by passing around the chain sprockets. After this operation the next approaching pair of lugs on the chain engage the free end of link 117 which is hooked into a bracket 118 on the container. The container will then be moved further to its transport position indicated by dotted lines in Fig. 4, on an adjacent platform such as that of a railway car 55.

Link 117 is also used to initiate the movement of container from the car to the truck, the link being used to pull the container toward the truck into a position wherein the lugs on the chains can directly engage the lugs on the container to complete the movement. The free end of the link 117 when not engaged by the chain lugs 112, 113 rests in the troughs 82 and is guided thereby. With the specific arrangement of the lugs shown there will be, in moving the body onto the truck, a sufficient pause in the movement of the body after it reaches transport position on the truck to enable the operator to stop the movement of the chains.

It is to be understood that it is within the scope of this invention to vary the number of lugs on either the chain or the body as only one on each is necessary for direct engagement with the container and for imparting movement to the container through the intermediary of a link.

As the floor of a container transported by a highway vehicle of the type disclosed is approximately 48" above the roadway and as a large proportion of L-C-L freight conveyed in such containers is packed in barrels and cases weighing seven to eight hundred pounds per unit means is provided whereby shipments of such weight may be vertically raised from the roadway to the height of the container floor or be lowered therefrom to the roadway by power.

At the rear end of the vertically movable frame 21 is a vertically movable platform 120, Figs. 1B and 2B, arranged to be raised and lowered parallel to vertical guides 121, 122 by means of a hoisting unit 123 which is shown and described in my United States Patent #2,204,236, granted June 11, 1940. Power for the operation of the elevator described is conveyed from a sprocket wheel 124 by a chain 125 which drives a sprocket 126 on a shaft 127 and also the pump sprocket 128 on the pump 30. Near the opposite end of the shaft 127 is a sprocket 131 connected by sprocket chain 130, with a sprocket 129 on the drive shaft of the hoisting unit 123. The operating controls 133 and 134, together with the details of the elevator and hoisting gear, are more fully described in my patent above referred to.

In service the highway type of side loading vehicle is operated as follows: Upon spotting the vehicle approximately two feet away from and substantially parallel to one side of a railway car, the chassis of the vehicle is anchored to the frame of the railway car by chains attached to the platform 21 and car at 135 and 136. Next, the ports of the hydraulic control valves 32 and 52 being closed, a lever 137 in the cab of the vehicle is moved in the proper direction to mesh the gears of the reversing unit 97 to rotate the shaft 98 in the direction desired. Next, a lever 138 is moved in the proper direction to mesh the power take-off gear in the unit 93 with the power gear of the engine 92, the operator allowing the engine to idle in neutral, then releases the clutch lever whereupon the slidable member of the clutch 101 and the pump 30 and the shaft 127 are set in motion, and rotary motion is thereby made available to the hoisting unit if and when desired.

As previously stated, prior to transferring a container, it may be necessary to level and elevate the frame 21 to the height of the platform of the railway car. To accomplish such adjustment, one of the levers 34 secured to the shaft 33 is raised to open valves 32 and 52, whereupon the platform begins to ascend level under the control of the gravity actuated control valves previously described. As soon as the frame releases the levers 73 on the chassis frame 20, the springs 71 close the valves of the vehicle spring locking mechanism.

Immediately the frame 21 attains the desired height it is secured at said height by turning the valve control shaft 33 to its neutral position. The operator then, by applying slight pressure of the hand to one of the levers 111, will close the friction clutch 101 to cause the container to be discharged from the vehicle. After a container has been discharged the frame 21 may be lowered until its stops 25 seat on the chassis 20 which automatically returns the action of the vehicle springs to normal.

It is, of course, possible to make many modifications in construction and design of the mechanisms herein shown and described, and I intend no limitations other than those imposed by the appended claims.

What I claim is:

1. A transfer vehicle of the class described, transverse guides thereon adapted to support a transferrable body, means on the vehicle for moving the body along the guides to or from an adjacent platform a distance exceeding the overall width of the transfer vehicle, said means comprising a reversible power driven sprocket chain permanently confined substantially within the overall width of the vehicle, a member on the chain arranged to engage the body directly, and means for operatively interconnecting the chain and the body when said body is not in position to be engaged by the member on the chain, said chain moving in one direction only during a complete transfer of said body.

2. A transfer vehicle of the class described, transverse guides thereon adapted to support a transferrable body, and means on the vehicle for moving said body along the guides to an adjacent platform from either side of the transfer vehicle a distance exceeding the overall width of the transfer vehicle, said means comprising a power driven endless sprocket chain permanently confined substantially within the overall width of the transfer vehicle, a member on said chain adapted to engage the body directly to impart movement thereto and thereafter to engage other means attachable to the body for imparting movement to the body when the body is not in position to be engaged by the member on the chain, the chain being moved in one direction only during a complete transfer operation and until a subsequent transfer operation.

3. A transfer vehicle of the class described, transverse guides thereon adapted to support a transferrable body, means on the vehicle for moving said body along the guides to or from transport position on an adjacent platform a distance exceeding the overall width of the transfer vehicle, comprising a reversible power driven endless sprocket chain permanently confined substantially within the overall width of said vehicle, a plurality of members on the chain arranged to engage the body directly to impart movement of the chain thereto, and a removable link attachable to the body also adapted for imparting movement of the chain to said body according to the direction of movement of the members on the upper run of said chain, any of said members on the chain engaging either the body or the link attached to the body to initiate movement of the body, the chain moving in one direction only during a complete transfer of said body to an adjacent platform.

4. A transfer vehicle of the class described, transverse guides thereon adapted to support a transferrable body, a removable link attachable at one of its ends to the body, lugs on the body near its sides and a lug positioned between the lugs at the sides under the body adapted to engage means on the vehicle for moving said body along the guides to an adjacent platform, said means comprising a power driven sprocket chain confined substantially within the overall width of the transfer vehicle, a member on the chain adapted to engage said lug positioned between the side lugs to initiate movement of the body, said member on the chain being also adapted to engage one of the side lugs thereafter to impart a further movement to the body, the member on the chain being further adapted to engage later the free end of the link attached to the body to impart final movement thereto.

5. A transfer vehicle of the class described, transverse guides thereon adapted to support a transferrable body, a removable link attachable at one of its ends to the body, and lugs on the body adapted to engage means on the vehicle for moving said body from an adjacent platform onto the transfer vehicle, said means comprising a power driven sprocket chain confined substantially within the overall width of the transfer vehicle, members on the chain, any one of said members being adapted to engage the free end of the link attached to the body when said body is on an adjacent platform to haul the body partially onto the guides of the transfer vehicle, any one of said members on the chain also being adapted to engage one of the lugs on the body to move said body into transport position on the transfer vehicle when the link is not engaged by a member on the chain.

6. A transfer vehicle of the class described, transverse guides thereon adapted to support a transferrable body, a removable link attachable to the body, means on the vehicle for moving the body along the guides, said means comprising a reversible power driven endless sprocket chain permanently confined substantially within the overall width of the transfer vehicle, a member on the chain and a lug on the body, said lug and the free end of the link attached to the body being arranged to be engaged successively by a member on the chain to move the body in separate stages of movement a distance exceeding the overall width of the transfer vehicle to or from an adjacent platform, said chain moving in one direction only during a complete transfer of the body.

7. A transfer vehicle of the class described, transverse guides thereon adapted to support a transferrable body, means on the vehicle for moving said body along the guides to or from transport position on an adjacent platform a distance exceeding the overall width of the transfer vehicle, comprising a reversible power driven endless sprocket chain, members thereon arranged to contact the body directly for imparting movement thereto, power operated mechanism on the vehicle arranged to impart a continuous movement to the chain, and a removable link attachable to the body and arranged to be propelled by the chain for also imparting movement to the body, any of the members on said chain contacting either the body or the link attached to the body to effect successive movements of the body during continuous movement of the chain.

8. A transfer vehicle of the class described, transverse guides thereon adapted to support a transferrable body, means on the vehicle for moving said body along the guides to or from transport position on an adjacent platform, a distance exceeding the overall width of the transfer vehicle, said means comprising members on a reversible power driven sprocket chain permanently confined substantially within the overall width of said vehicle arranged to contact the body for imparting movement thereto, power operated mechanism on the vehicle arranged to impart a continuous movement to the chain, and a removable link attachable to the body and arranged to be propelled by said chain for also imparting movement to the body, a plurality of members on the chain any of which contact either the body or the link attached to the body to effect successive movements of the body during continuous movement of the chain.

9. A transfer vehicle of the class described having a chassis, a frame on the chassis, transverse guides on the frame adapted to support a transferrable body, means on the frame for moving said body along the guides to or from transport position on an adjacent platform a distance exceeding the overall width of the transfer vehicle, said means comprising propelling members on a reversible power driven endless sprocket chain running above and below said frame, said chain being permanently confined substantially within the overall width of the transfer vehicle wherein any of the propelling members on the upper run of the chain are adapted to engage the body directly, and thereafter to engage other means attachable to said body for imparting movement to the body when the body is not in position to be engaged by the propelling members, the propelling members on the upper run of the chain moving in one direction only during a complete transfer of the body.

10. A transfer vehicle of a class described, transverse guides thereon adapted to support a transferrable body, means on the vehicle for moving said body along the guides to or from an adjacent platform a distance exceeding the overall width of the transfer vehicle, said means comprising a reversible power driven sprocket chain permanently confined substantially within the overall width of the transfer vehicle a member on the chain adapted to engage the body directly to impart a limited movement thereto, a removable link attachable at one of its ends to said body arranged to be engaged and to be propelled by its other end by the member on the chain to impart further movement to the body, and means for guiding said other end of the link when said other end is not engaged by the chain.

11. The combination of a highway truck and a railway car, each equipped with transverse channels, a demountable container having skid rails on its bottom adapted to occupy said channels, a propelling chain on the highway truck having lugs any of which is adapted to engage the container, and a push-and-pull bar adapted to engage the container and be removably attached to the propelling mechanism.

12. The combination of a highway truck equipped with transverse guides, a demountable container slidably supported on said guides, means on the truck for moving the container on the guides to or from an adjacent platform on either side of the truck, said means comprising a reversible propelling chain permanently confined substantially within the overall width of the truck, lugs on the chain, any one of which is adapted to engage the container directly for moving said container on the guides toward or away from said platform, combined with a removable push-and-pull bar for operatively interconnecting the chain and the body when the body is not in position to be engaged by a lug on the chain, said chain moving in one direction only during a complete transfer of the container.

13. The combination of a highway truck having a chassis, said truck being equipped with transverse container guides, a demountable container slidably supported on said container guides, means on the truck for moving the container on the container guides to or from an adjacent platform on either side of the truck, a transverse chain guide on the truck supported by and extending beyond each side of the chassis, said means comprising an endless reversible propelling chain on the chain guide permanently confined substantially within the overall width of the truck, sprockets supported by the chain guide near the outer ends thereof, lugs on the chain, any one of which is adapted to engage the container directly for moving said container on the container guides toward or away from said platform, combined with a removable push-and-pull bar for operatively interconnecting the chain and the body when the body is not in position to be engaged by a lug on the chain, said chain moving in one direction only during a complete transfer of the container.

14. The combination of a highway truck having a chassis, said truck being equipped with transverse container guides, a demountable container slidably supported on said container guides, means on the truck for moving the container on the container guides to or from an adjacent platform on either side of the truck, a transverse chain guide on the truck supported by and extending beyond each side of the chassis, said means comprising an endless reversible propelling chain on the chain guide permanently confined substantially within the overall width of the truck, sprockets supported by the chain guide near the outer ends thereof, lugs on the chain any one of which is adapted to engage the container directly for moving said container on the container guides toward or away from said platform, combined with a removable push-and-pull bar for operatively interconnecting the chain and the body when the body is not in position to be engaged by a lug on the chain, said chain moving in one direction only during a complete transfer of the container, the end of said push-pull bar being arranged to rest on said chain guide in chain engaging position.

15. The combination of a highway truck and a railway car, each equipped with transverse channels, a demountable container having skid rails on its bottom adapted to occupy said channels, a propelling chain on the highway truck having lugs any of which is adapted to engage the container, a push-and-pull bar adapted to engage the container and be removably attached to the propelling mechanism, and means on said truck and car remote from the channels thereon for facilitating the alinement of said channels.

16. The combination of a highway truck and a railway car each equipped with transverse guides, a demountable container adapted to slide on said guides, a propelling chain on the highway truck having lugs any of which is adapted to engage the container, a push-and-pull bar adapted to engage the container and be removably attached to the propelling mechanism, the guides on said railway car being adapted to maintain the container in alinement with the transfer mechanism on the truck when the container is beyond control of the guides on said truck during movement of the container to the railway car.

17. A vehicle of the class described having a chassis, wheels below the chassis adapted for supporting the vehicle, transverse guides on the vehicle arranged to support a transferrable body, means on the vehicle for moving said body along the guides to an adjacent platform a distance exceeding the overall width of the transfer vehicle, said means comprising a sprocket chain permanently confined substantially within the width of the vehicle, a member on said chain arranged to engage the body directly, and other means for operatively interconnecting the chain and the body when said body is not in position to be engaged by the member on the chain, said chain moving in one direction only during a complete transfer of the body, and means for bringing the guides to a horizontal position when the vehicle is at rest out of level.

18. A vehicle of the class described having a chassis, wheels below the chassis adapted for supporting the vehicle, a frame on the chassis, transverse guides on the frame arranged to support a transferrable body, means on the frame for moving said body along the guides to an adjacent platform a distance exceeding the overall width of the transfer vehicle, said means comprising a sprocket chain permanently confined substantially within the width of the vehicle, a member on the chain arranged to engage the body directly, and other means for operatively interconnecting the chain and the body when said body is not in position to be engaged by the member on the chain, said chain moving in one direction only during a complete transfer of the body, means on the vehicle for elevating the frame above the chassis, and automatic means for maintaining the said frame substantially horizontal during its elevation when the vehicle is at rest out of level.

19. A vehicle of the class described having a frame, an elevator attached thereto, transverse guides on the frame adapted to support a transferrable body, means for moving the body along the guides to or from an adjacent platform a distance exceeding the width of the transfer vehicle, said means comprising a reversible power driven sprocket chain permanently confined substantially within the overall width of said vehicle, a member on the chain arranged to engage the body directly and other means for operatively interconnecting the chain and the body when said body is not in position to be engaged by the chain, said chain moving in one direction only during a complete transfer operation, and power means on the vehicle for moving the vehicle and for raising the elevator and driving the chain.

20. A vehicle of the class described, power means for moving the vehicle, said vehicle having a chassis and wheels adapted to support the chassis, a frame on the chassis, means on said frame for supporting a transferrable body, power means for shifting said body on the frame transversely a distance exceeding the overall width of the vehicle, means for actuating said shifting means by said power means, the shifting means comprising a sprocket chain permanently confined substantially within the overall width of the vehicle, a member on the chain arranged to engage the body directly, and means for operatively interconnecting the chain and the body when said body is not in a position to be engaged by the member on the chain, elevating means permanently attached to the frame, means for actuating said elevating means by said power means, and means for automatically controlling the elevating means to maintain the frame substantially horizontal transversely of the vehicle while the vehicle is at rest out of level transversely.

21. A vehicle of the class described having a chassis and wheels below the chassis adapted to support the chassis, a power generator on the vehicle, a load supporting frame adjustable in relation to the chassis, transverse guides on the frame, mechanisms on the frame for elevating the frame and for moving loads along the guides to or from an adjacent platform a distance exceeding the overall width of the vehicle, said moving mechanism comprising a sprocket chain permanently confined substantially within the overall width of the vehicle, a member on the chain arranged to engage the body directly and means for operatively interconnecting the chain and the body when said body is not in a position to be engaged by the member on the chain and flexible connections between the power generator and said mechanisms, said connections including means for maintaining the frame substantially horizontal during its elevation when the chassis is at rest out of level.

22. A vehicle of the class described having a chassis and wheels below the chassis adapted to support the chassis, springs between the chassis and the wheels, a frame on the chassis, guides on the frame arranged to support a transferrable body, power means for moving said body along the guides to or from an adjacent platform a distance exceeding the overall width of the vehicle, said means comprising a sprocket chain permanently confined substantially within the overall width of the vehicle, a member on the chain arranged to engage the body directly, and means for operatively interconnecting the chain and the body when said body is not in a position to be engaged by the member on the chain, power means for elevating the frame above the chassis, means for automatically controlling the elevating means to maintain said frame substantially horizontal during its elevation when the chassis is at rest out of level, means for locking the springs, and automatic means for unlocking the springs when the frame is at rest on the chassis.

23. A transfer vehicle of the class described having a frame and wheels below the frame, springs between the frame and the wheels, transverse guides on the frame adapted to support a transferrable body, means on the frame for moving the body along the guides to or from an adjacent platform a distance exceeding the overall width of the transfer vehicle, said means comprising a power driven reversible sprocket chain permanently confined substantially within the overall width of said vehicle, a member on the chain arranged to engage the body directly and means for operatively interconnecting the chain and the body when said body is not in a position to be engaged by the member on the chain, and means for locking the springs to prevent vertical movement of the frame during movement of the body to or from the transfer vehicle.

24. A vehicle of the class described having a chassis and wheels below the chassis adapted to support the chassis, springs between the chassis and the wheels, a frame on the chassis for supporting loads, means on the vehicle for horizontally moving a load supported on the frame to or from an adjacent platform a distance exceeding the overall width of the vehicle, said moving means comprising a sprocket chain permanently confined substantially within the overall width of the vehicle, a member on the chain arranged to engage the body directly and means for operatively interconnecting the chain and the body when said body is not in a position to be engaged by the member on the chain, power means for elevating the frame above the chassis, and means for locking the springs.

25. A vehicle of the class described having a chassis and wheels below the chassis adapted to support the chassis, springs between the chassis and the wheels, a frame on the chassis, guides on the frame arranged to support a transferrable body, power means for moving said body along the guides to or from an adjacent platform, a distance exceeding the overall width of the vehicle, said means comprising a sprocket chain permanently confined substantially within the overall width of the vehicle, a member on the chain arranged to engage the body directly and means for operatively interconnecting the chain and the body when said body is not in a position to be engaged by the member on the chain, power means for elevating the frame above the chassis, means for automatically controlling the elevating means to maintain the said frame substantially horizontal during its elevation when the chassis is at rest out of level, and means for locking the springs.

HAROLD W. SHONNARD.